No. 644,944. Patented Mar. 6, 1900.
A. A. PRALL.
STORM FRONT FOR BUGGIES.
(Application filed July 26, 1899.)
(No Model.)
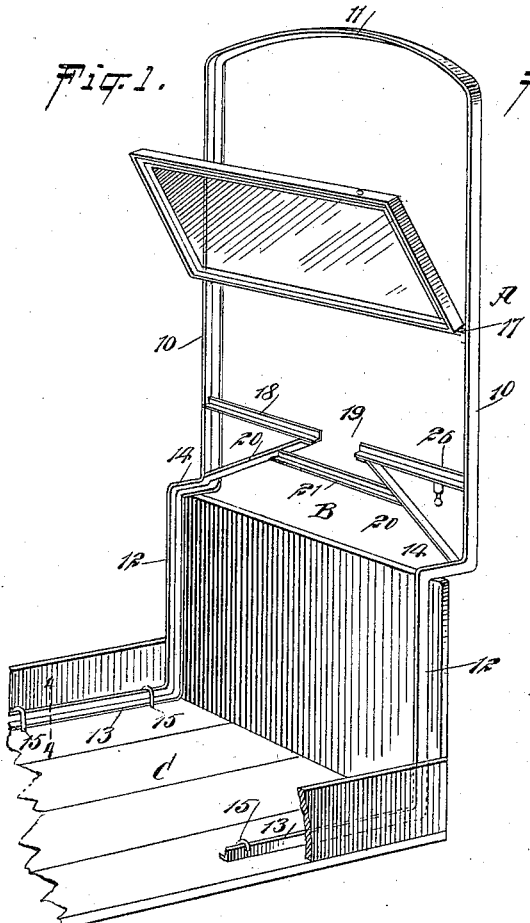
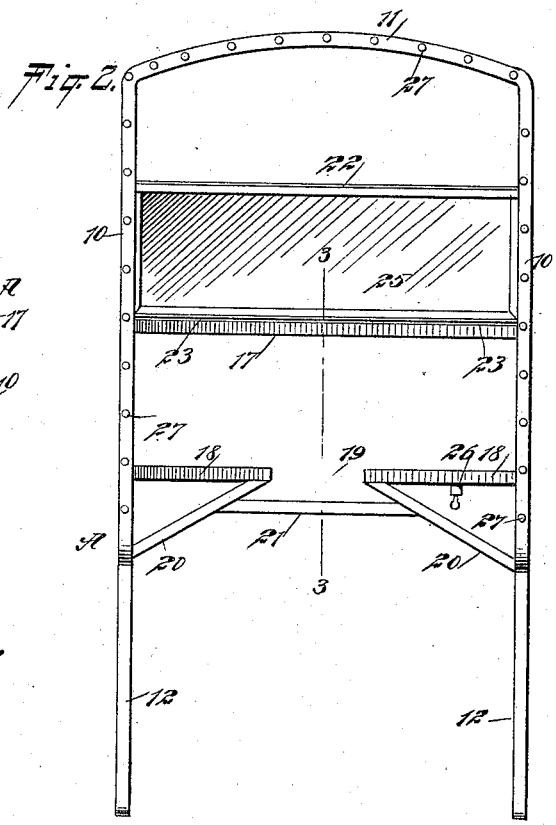
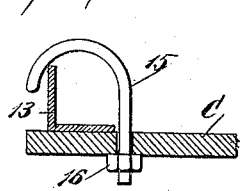
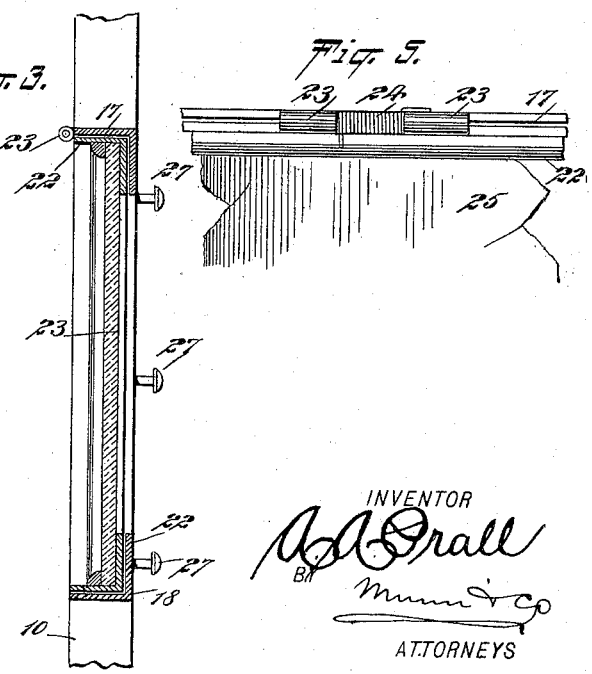
WITNESSES:
William P. Goebel.
Jred Acker.
INVENTOR
A. A. Prall
BY
Munn & Co.
ATTORNEYS
THE NORRIS PETERS CO., PHOTO-LITHO., WASHINGTON, D. C.

UNITED STATES PATENT OFFICE.

ARTHUR AMIN PRALL, OF DAYTON, IOWA.

STORM-FRONT FOR BUGGIES.

SPECIFICATION forming part of Letters Patent No. 644,944, dated March 6, 1900.

Application filed July 26, 1899. Serial No. 725,166. (No model.)

*To all whom it may concern:*

Be it known that I, ARTHUR AMIN PRALL, of Dayton, in the county of Webster and State of Iowa, have invented a new and Improved Storm-Front for Buggies, of which the following is a full, clear, and exact description.

One object of my invention is to provide a storm-front for buggies comprising a frame constructed for attachment at the dashboard and adapted to extend upward beyond the dashboard and constitute a front support for a storm-curtain, which frame may be readily and expeditiously attached to the vehicle-body and as readily disconnected therefrom.

A further object of the invention is to provide the frame with a window or pane of glass and means for holding said window or pane in a closed or in an open position.

Another object of the invention is to provide an opening in the frame through which to pass the driving-lines and means whereby when the window is open the space unclosed may be utilized to secure a more extended command of the lines should occasion require.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures:

Figure 1 is a perspective view of the improved device applied to the body of the vehicle, the window being shown open. Fig. 2 is a front elevation of the device detached from the vehicle-body, the window being also open. Fig. 3 is a vertical section taken practically on the line 3 3 of Fig. 2. Fig. 4 is a detail sectional view illustrating one mode of attaching the device to the vehicle, and Fig. 5 is a detail view illustrating the character of one of the hinges employed for connecting the window with the frame of the device.

The body A of the device consists of a skeleton frame, and said frame comprises two upper side sections 10, adapted to extend beyond the dashboard B of the vehicle C, the said upper side sections being connected by a top bar 11, arched or otherwise formed, together with lower vertical side sections 12, adapted to engage with the inner face of the dashboard B, horizontal foot-sections 13, continuous with the lower side sections 12 and adapted to engage with the floor of the vehicle-body C, as shown in Fig. 1, and horizontal connecting side members 14, that extend from the lower vertical side members 12 to the upper vertical side members 10, as is also best shown in Fig. 1. When the frame is in position in a vehicle, the horizontal connecting side members 14 engage with the top of the dashboard, and the foot members 13 are secured to the bottom of the vehicle by means of hooks 15, which extend through said bottom, being provided with nuts 16 at their lower ends, as shown in Fig. 1, so that by giving the hooks 15 a quarter-turn in one or the other direction they may be made to engage with the foot members 13 of the frame or be carried out of engagement therewith, since in moving in one direction the hooks will unscrew from the nuts 16 and when moved in the opposite direction the shanks of the hooks will be carried downward through the medium of said nuts.

In the further construction of the body A an upper cross-bar 17 is provided, extending from one upper side member 10 to the other, and below the said upper cross-bar 17 a second and parallel cross-bar 18 is located, having an opening 19 at its center, so that the said lower cross-bar is divided into two sections, and each section of the cross-bar 18 is supported at its inner end by a brace 20. The braces are connected below the opening 19 by means of a short cross-bar 21. The entire frame is preferably constructed of angle-iron or angular material, and likewise the cross-bars 17 and 18. The braces 20 and short cross-bar 21 may likewise be constructed of angle-iron or angular material, or they may be plain. A window-frame 22, also preferably constructed of angle-iron or similar material, is connected with the upper cross-bar 17 by hinges 23, one of the said hinges being shown in Fig. 5, and each hinge is provided with a spring 24 of the ordinary type, the said springs acting to throw the frame upward and hold said frame normally in the upper position illustrated in Fig. 1. A pane of glass or a pane 25 of other transparent material is fitted in the frame 22, and when the window-frame 22 is closed it will fill the space intervening the upper and lower cross-bars 17 and 18 and the upper side members 10 of the frame. The window-frame fits snugly to the two members of both side pieces and cross-bars when said parts are of angular construction in cross-section, thus effectually protecting the inside of the vehicle from the elements in stormy weather. When the window-frame 22 is closed, it is held in its closed position by one or more latches 26 of any approved type, and these latches may be released by hand or by the foot of the driver, according to their construction, so that the hinges 23 may cause the window to quickly open. Such quick action is sometimes desirable, since the driving-lines pass through the space 19 above the short cross-bar 21 when the window is closed and the driver's command of the lines is therefore limited. In the event the animal in harness should become restive or frightened the window may be quickly opened and so held, and a better control of the horse can be obtained by means of the space formerly closed by said window.

The front of the frame is provided with buttons 27 of any desired character, to which a storm-curtain may be secured, and said storm-curtain may also be attached to the upper cross-bar 17 and lower divided cross-bar 18; but the curtain is not intended to cross the space closed by the said window.

The frame A is preferably somewhat narrower than the dashboard, so that the curtain when carried to the canopy or top of the buggy will diverge in opposite directions from the frame, and it will be readily understood that the sides of the storm-curtain may be provided with sights, if desired; but the window in the frame or body A will not only permit a clear view ahead, but also a limited side view in either direction.

Having thus described my invention, I claim as new and desire to secure by Letters Patent—

1. A storm-front for vehicles, comprising a frame arranged for attachment at the dashboard of the vehicle and adapted to extend above the same, said frame being provided with a window, and means for locking the window in a closed position, the said window being hinged and spring-controlled whereby when released from the locking device it is thrown open and held in the open position.

2. A storm-front for buggies, comprising a frame adapted for attachment to a vehicle at the dashboard and to extend above the same, the said frame being provided with a spring-controlled window, a lock for the said window, devices for the attachment of a storm-curtain, and an opening for the driving-reins, which opening leads into the space adapted to be closed by the said window, as described.

3. A storm-front for buggies, comprising a frame consisting of upper vertical side bars, an upper connecting cross-bar, lower vertical side bars provided with horizontal feet and means for attaching the feet to the body of the vehicle, together with horizontal side bars connecting the upper and the lower sections, an intermediate cross-bar located in the upper portion of the said frame, a lower cross-bar in the same section of the frame, a window hinged to the upper cross-bar and arranged for engagement with the lower one, and a lock for the said window, substantially as described.

4. A storm-front for buggies, comprising a frame consisting of upper vertical side bars, an upper connecting cross-bar, lower vertical side bars provided with horizontal feet and means for attaching the feet to the body of the vehicle, together with horizontal side bars connecting the upper and the lower sections, an intermediate cross-bar located in the upper section of the frame, a lower parallel cross-bar having an opening in its center, braces for the inner ends of the divided cross-bar, and a short cross-bar connecting the braces, so that a space is formed for the driving-reins below the divided cross-bar, which space communicates with the space between the two cross-bars, a spring-controlled window hinged to the upper cross-bar and arranged for closing engagement with the divided cross-bar and the upper side bars of the frame, and a lock for said window, substantially as described.

ARTHUR AMIN PRALL.

Witnesses:
E. M. LUNDIEN,
M. E. CURTIS.